July 14, 1959 J. H. CARR 2,894,537
VENT PIPE
Filed Sept. 27, 1957
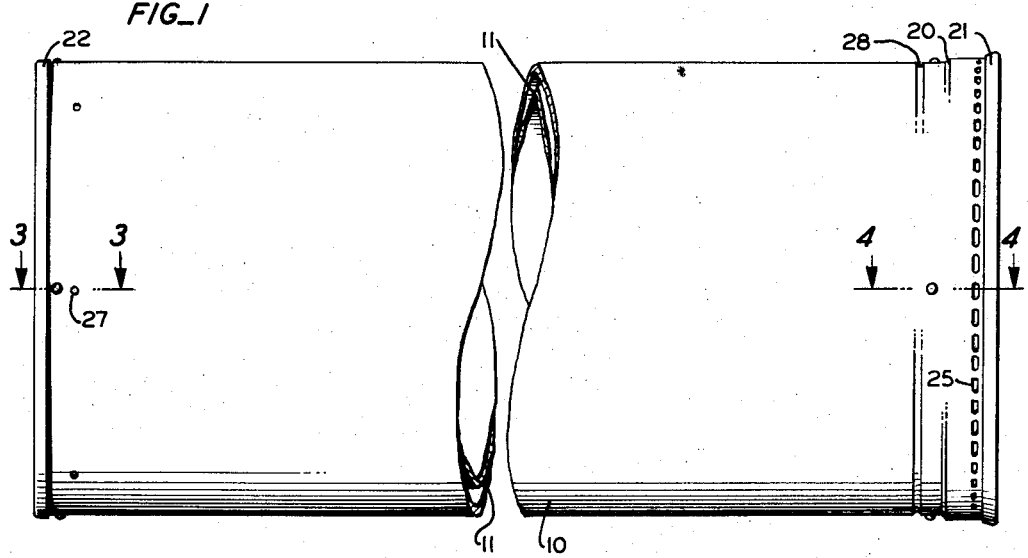
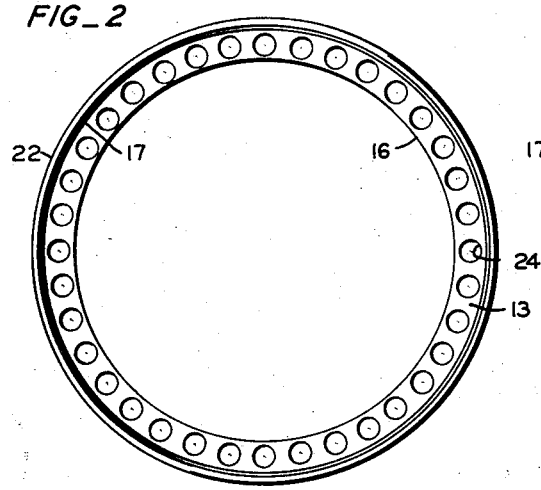
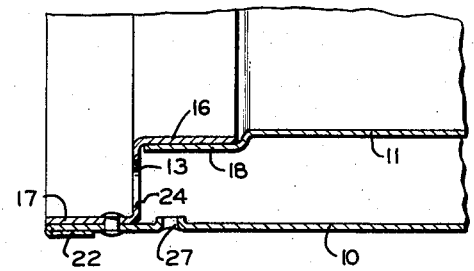
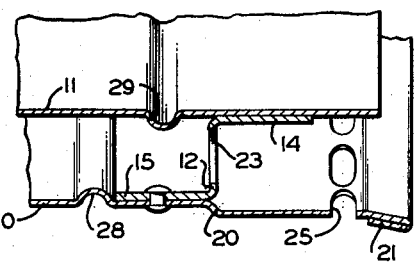
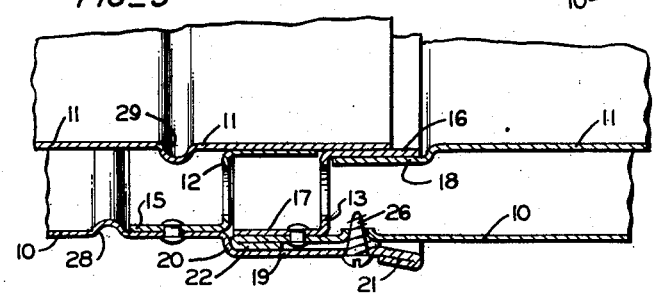
INVENTOR.
JOHN H. CARR
ECKHOFF & SLICK
ATTORNEYS
BY
A MEMBER OF THE FIRM.

United States Patent Office 2,894,537
Patented July 14, 1959

2,894,537

VENT PIPE

John H. Carr, Mountain View, Calif., assignor to Dura-Vent Corporation, a corporation of Delaware Application September 27, 1957, Serial No. 686,767

2 Claims. (Cl. 138—63)

This invention relates to a sectional, double-walled vent pipe wherein the individual sections are arranged for telescopic connection with one another as the pipe is erected.

Double-walled pipes are used for a variety of applications, being relatively light in weight, easy to erect, and affording good insulating characteristics. They are strong and require little space and thus may readily be installed close to structural parts of a building without fire hazard. However, the double-walled vent pipes heretofore available have been expensive and generally unsatisfactory due to the lack of adequate means for positively sealing the respective section ends together. Another difficulty has been the lack of means for accurately holding the respective inner and outer walls of each section in the desired spaced, concentric relationship, while yet affording said sections to be rapidly assembled by the manufacturer in an inexpensive fashion. It is an object of the invention to overcome these shortcomings of prior art structures.

According to the present invention there is provided a double-walled pipe wherein the respective inner and outer walls of each pipe section are held in the desired spaced, concentric relation by means of a pair of collars mounted between the pipe walls, one adjacent each end of the pipe section, but recessed from said end. Each of said collars is provided with an inner peripheral, annular flange which parallels the inner wall of the pipe and frictionally engages the same, while a similar, but oppositely disposed, outer peripheral flange engages the outer wall and is riveted or otherwise secured thereto. At one end of the pipe, the terminal portion of the outer wall extending beyond the collar is expanded to form an annular female fitting between the walls, while at the opposite, or male, end of the pipe the terminal portion of the inner wall (which is somewhat shorter than the outer wall) is expanded outwardly, said end abutting the adjacent collar, and the inner flange in the collar engaging the inner surface of said expanded wall portion. The collars in each pipe section are perforated to permit passage of air and prevent local overheating, while the expanded female end portion of the outer pipe wall is also provided with a series of apertures about its periphery. These and other elements of the pipe will be more fully understood by reference to the drawing forming a part of the application, wherein:

Figure 1 is a side view, cut away to show the spacing between the walls, of a section of double-walled pipe made in accordance with the present invention;

Figure 2 is a view of the left end of the pipe shown in Figure 1;

Figure 3 is a sectional view on an enlarged scale, taken along the line 3—3 in Figure 1;

Figure 4 is a sectional view, again on an enlarged scale, taken along the line 4—4 in Figure 1; and Figure 5 is a sectional view showing the manner in which the male end of one section of pipe (Figure 3) is received into the female end (Figure 4) of an adjoining pipe section as the two sections are joined.

Referring more particularly to the drawing, there is shown in each of the figures a double-walled pipe section having an outer wall 10 and an inner wall 11 of somewhat shorter length than the outer wall. These walls are held in spaced, concentric relationship to one another by means of a pair of collars 12 and 13, the collar 12 being positioned between the walls adjacent the expanded female end of the pipe (Figure 4), while collar 13 is similarly positioned adjacent the male end thereof (Figure 3). Each of the collars is provided with an inner peripheral flange and with an oppositely directed, outer peripheral flange, the respective inner and outer flanges on collar 12 are numbered 14 and 15 while those on collar 13 are numbered 16 and 17. The inner flanges 14 and 16 parallel the inner wall 11 and frictionally engage the same, while the oppositely projecting, outer flanges 15 and 16 similarly parallel the outer wall 10 and are riveted or otherwise secured thereto. It should be noted that at the male end of the pipe, the end of the inner wall abuts collar 13, and that flange 16, which projects inwardly into the pipe, engages the inner surface of said wall, the engaged wall portion being expanded outwardly, as shown at 18 in Figure 3, to permit of its passage and that of flange 16 into the annular female fitting of an adjoining section of pipe.

Said female fitting (Figure 4) is formed by outwardly expanding the terminal portion 19 of wall 10 at the end of the pipe, the shoulder 20 so formed acting as a stop for the outer wall portion of the entrant, or male end of an adjoining section of pipe, as shown in Figure 5. This stop action is reinforced by collar 12, which adjoins shoulder 20, and by flange 14 which engages collar 13 as the two pipe sections are brought together. It will be observed that this makes for a particularly strong non-flexible connection between said sections, which action is furthered in that flange 16 frictionally engages the outer surface of wall 11 for a considerable distance before said stops simultaneously come into play.

The terminal portion of wall 10 at the female end of the pipe is provided with an outwardly bevelled lip 21, the better to facilitate entry of the pipe sections as adjacent units thereof are brought together. The lip 21 may be folded inwardly or outwardly, or the folding may be eliminated. Wall 10 may be provided with folded reinforcing lip 22 at its other end, if desired, which may be folded inwardly or outwardly, although the pipe will be sufficiently strong for most purposes without the folding.

Collars 12 and 13 are provided with apertures 23 and 24 which permit of circulation of air, from one section to another, in the otherwise dead air space between walls 10 and 11, thereby preventing localized overheating of any given wall section. Wall 10 is also provided with a series of apertures 25 about its periphery adjacent lip 21, which serves to receive self-tapping screws 26 (Figure 5) as the sections are joined to one another, the threaded portion of the screws engaging in small openings 27 as provided at intervals about the periphery of wall 10 adjacent collar 13, as shown in Figure 3.

It will be noted that wall 10 is provided with an annular, inwardly formed boss 28 adjacent the end of flange 15, this boss acting as an assembly stop in fabricating the individual pipe sections. Wall 11 is provided with a similar, but outwardly formed boss 29 which prevents the inner pipe from slipping out of the outer pipe.

The composite pipe of the present invention may be fabricated of any thin, strong material such as sheet iron, galvanized sheet iron, or aluminum. Preferably the inner pipe is of aluminum while the outer pipe is of galvanized iron.

I claim:

1. A section of a double-walled pipe having respective male and female ends whereby like sections are adapted to be telescopically fitted to one another, said sections comprising in combination an outer wall, an inner wall spaced from the outer wall and concentric therewith, the inner wall being somewhat the shorter and terminating longitudinally inwardly of the outer wall at, at least, the female end of the section, a first perforated collar recessively positioned between said walls adjacent the female end of the section and a second perforate collar recessively mounted at the other section end in abutting relation to the end of the inner wall, said section having the terminal portion of the outer wall extending beyond said first collar and expanded outwardly to form an annular female fitting between the walls, and at the male end having a terminal portion of the inner wall expanded outwardly, each of said collars comprising an annular, perforate, spacing element extending between the section walls, and having an inner peripheral flange depending from said element which parallels the inner wall of the section and frictionally engages the same and an oppositely directed outer peripheral flange which parallels the outer section wall and is mechanically secured thereto, and the inner flange at the male end of section line adjacent the interior surface of the expanded section of the inner wall.

2. The structure of claim 1 wherein the expanded wall portion at the female end of the section is provided with a series of perforations about its periphery at a position adjacent the lip, and wherein other perforations are provided about the periphery of the outer wall at a position adjacent the male end of the section such that said perforations will come into at least partial registry with those in the female end of the adjacent section as like sections are joined.

References Cited in the file of this patent

UNITED STATES PATENTS

| | | |
|---|---|---|
| 1,152,568 | Stearns | Sept. 7, 1915 |
| 2,650,112 | Kinkead | Aug. 25, 1953 |